(12) United States Patent  (10) Patent No.: US 9,244,982 B2
Narayanan et al.  (45) Date of Patent: Jan. 26, 2016

(54) STATIC ANALYSIS OF PL/SQL OBJECTS AND SQL QUERIES

(71) Applicant: ORACLE INTERNATIONAL CORPORATION, Redwood Shores, CA (US)

(72) Inventors: Sivabalan Narayanan, Trichy (IN); Ankit Mahanot, Delhi (IN); Vilas Varghese, Kerala (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 329 days.

(21) Appl. No.: 13/721,490

(22) Filed: Dec. 20, 2012

(65) Prior Publication Data

US 2014/0181798 A1  Jun. 26, 2014

(51) Int. Cl.
*G06F 9/45* (2006.01)
*G06F 17/30* (2006.01)
*G06F 9/44* (2006.01)

(52) U.S. Cl.
CPC ............ *G06F 17/3051* (2013.01); *G06F 8/427* (2013.01); *G06F 8/75* (2013.01)

(58) Field of Classification Search
CPC ........ G06F 8/427; G06F 17/3051; G06F 8/75
USPC ........................................................ 717/143
See application file for complete search history.

(56) References Cited

U.S. PATENT DOCUMENTS

| | | | |
|---|---|---|---|
| 7,370,049 B2 | 5/2008 | Doole et al. | |
| 2001/0011371 A1* | 8/2001 | Tang | 717/9 |
| 2003/0131284 A1* | 7/2003 | Flanagan et al. | 714/38 |
| 2003/0182276 A1* | 9/2003 | Bossman et al. | 707/3 |
| 2003/0200214 A1* | 10/2003 | Doole et al. | 707/8 |
| 2008/0126902 A1* | 5/2008 | Hickman et al. | 714/741 |
| 2008/0270983 A1* | 10/2008 | Ahadian et al. | 717/113 |
| 2010/0235349 A1 | 9/2010 | Kuno et al. | |
| 2010/0325620 A1 | 12/2010 | Rohde et al. | |
| 2013/0166513 A1* | 6/2013 | Rajaram | 707/687 |

OTHER PUBLICATIONS

Sybase http://infocenter.sybase.com/help/index.jsp?topi=/com.sybase.infocenter.dc37696.1550/html/esqlcob/X28072.htm.
Annamaa, A., et al. "An interactive tool for analyzing embedded SQL Queries", *Programming Languages and Systems: 8th Asian Symposium, APLAS 2010*, 2010, pp. 131-138.
U.S. Appl. No. 13/721,490, Patent Search mailed on Oct. 17, 2013.

* cited by examiner

*Primary Examiner* — Li B Zhen
*Assistant Examiner* — Viva Miller
(74) *Attorney, Agent, or Firm* — Kilpatrick Townsend & Stockton LLP

(57) ABSTRACT

Embodiments of the invention provide systems and methods for performing static analysis of query expressions embedded in programming language source code. According to one embodiment, performing static analysis of one or more query expressions embedded in programming language source code can comprise extracting the one or more query expressions from the programming language source code, performing the static analysis on the extracted one or more query expressions, and reporting results of performing the static analysis on the one or more query expressions, wherein the results relate errors and warning generated by performing the static analysis to the source code from which the one or more query expressions are extracted.

15 Claims, 6 Drawing Sheets

STATIC ANALYSIS OF PL/SQL OBJECTS AND SQL QUERIES

BACKGROUND OF THE INVENTION

Embodiments of the present invention relate generally to methods and systems for performing a static analysis on software source code and more particularly to performing static analysis of query expressions embedded in programming language source code.

Applications that utilize a database are often developed with database commands, queries, and/or objects embedded in the source code of those applications. For example, Procedural Language/Structured Query Language (PL/SQL) is a programming language often embedded in applications utilizing databases. As a database implementation grows, the amount of business logic coded in it becomes quite significant. Additionally, for large applications such as enterprise applications, use of the database and the embedded SQL code for doing so can be extensive and voluminous. A need exists to improve the quality of the code used in such PL/SQL program units. However, current approaches to verifying or analyzing source code do not provide a way to also analyze the embedded database commands or queries. As a result, there is often a failure to verify the quality of PL/SQL or other embedded SQL code to locate potentially vulnerable code. The cost of bugs or vulnerabilities exponentially increases with the delay in finding them. Hence, there is a need for improved methods and systems for performing static analysis of query expressions embedded in programming language source code which would analyze PL/SQL in the source code files to find out both critical and trivial bugs which would be of useful to the developer to improve the quality of the code.

BRIEF SUMMARY OF THE INVENTION

Embodiments of the invention provide systems and methods for performing static analysis of query expressions embedded in programming language source code. According to one embodiment, performing static analysis of one or more query expressions embedded in programming language source code can comprise extracting the one or more query expressions from the programming language source code and performing the static analysis on the extracted one or more query expressions. Extracting the one or more query expressions and performing the static analysis can comprise reading the source code in which the one or more query expressions are embedded, parsing the source code in which the one or more query expressions are embedded, extracting query expression code for the one or more query expressions from the parsed source code, creating a procedure from the extracted query expression code, and compiling the created procedure.

Results of performing the static analysis on the one or more query expressions can be reported. The results can relate errors and warning generated by performing the static analysis to the source code from which the one or more query expressions are extracted. For example, reporting the results of performing the static analysis on the one or more query expressions can comprise receiving one or more errors or warnings from compiling the created procedure, categorizing the received one or more errors or warnings, mapping the categorized errors or warnings to the source code from which the one or more query expressions were extracted, and generating a report of the categorized and mapped one or more errors or warnings.

In some cases, performing the static analysis can further comprise analyzing use of one or more database tables by the extracted one or more query expressions, detecting a collision between triggers in the extracted one or more query expressions based on said analyzing, and generating an error or warning based on detecting the collision. Additionally or alternatively, performing the static analysis can comprise applying one or more user defined rules to the extracted one or more query expressions and, in response to any of the extracted one or more query expressions violating the one or more user defined rules, generating an error or warning. In one embodiment, generating the report of the categorized and mapped one or more errors or warnings can additionally or alternatively comprise categorizing the one or more errors or warnings based on a content of each error or warning and assigning an additional message to errors and warnings considered to be difficult to understand based on said categorizing. In yet another embodiment, generating the report of the categorized and mapped one or more errors or warnings can additionally or alternatively comprise assigning to one or more of the errors or warnings a help snippet from a repository of help information and based on the error or warning.

DETAILED DESCRIPTION OF THE INVENTION

Figure 1:
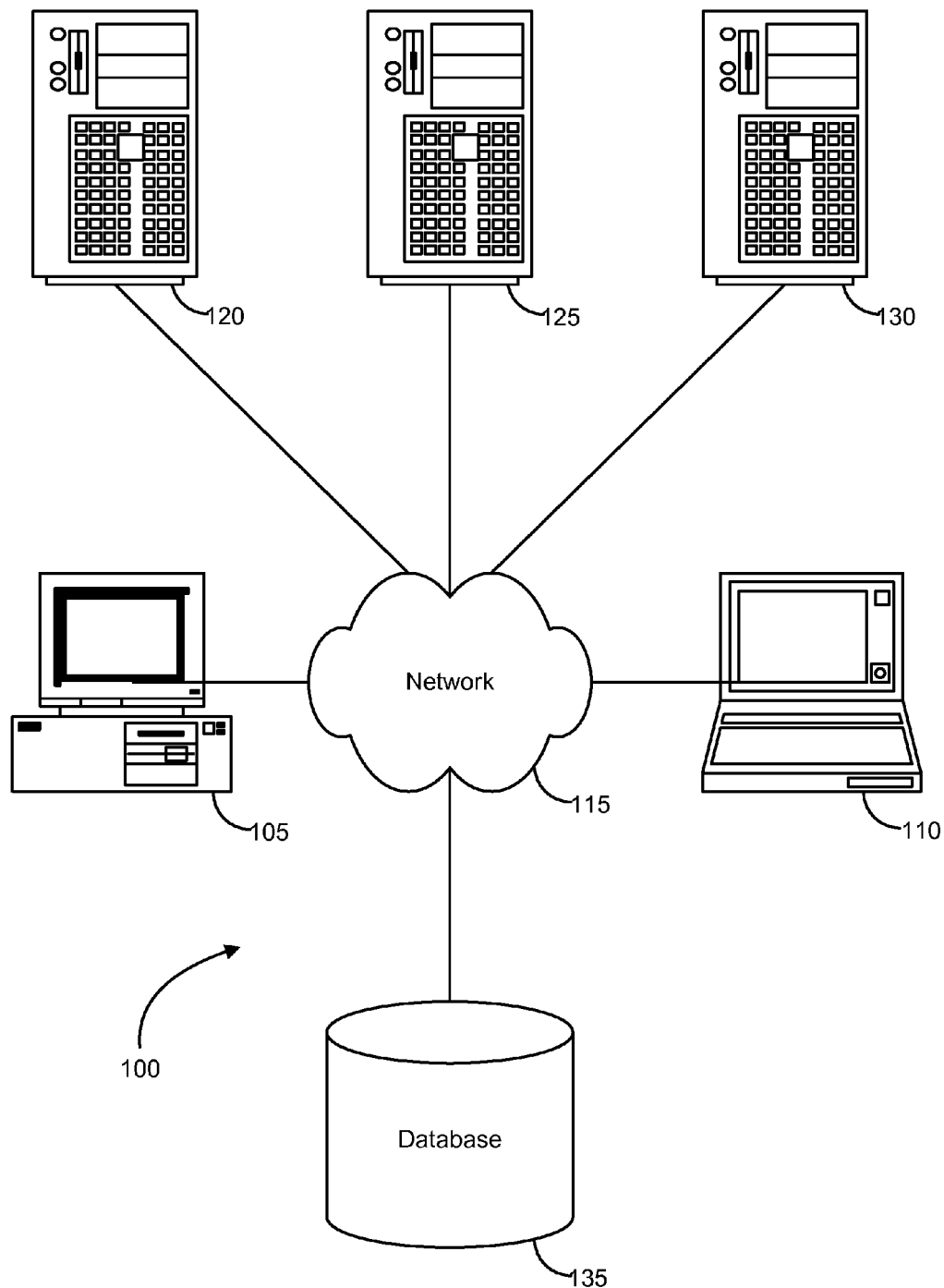
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for performing static analysis of query expressions embedded in programming language source code or of PL/SQL code not embedded in source code. Generally speaking, embodiments of the present invention provide for performing static analysis of query expressions embedded in programming language source code which would analyze Procedural Language/Structured Query Language (PL/SQL) or other scripts and commands embedded in the source code files to find out both critical and trivial bugs which would be of useful to the developer to improve the quality of the code. According to one embodiment, performing static analysis of one or more query expressions embedded in programming language source code can comprise extracting the one or more query expressions from the programming language source code. The static analysis can be performed on the extracted one or more query expressions. Results of performing the static analysis on the one or more query expressions can be reported, e.g., through a user interface of an analysis tool etc. The results can relate errors and warning generated by performing the static analysis to the source code from which the one or more query expressions are extracted, e.g., by line number, function or module name, and/or in other ways.

In some implementations, embodiments of the present invention can allow third-party static analyzers to be integrated, thereby giving the combined reports of results obtained from a static analyzer native to a given development environment together with results from another, third-party static analyzer. Embodiments of the present invention can also provide the flexibility to define conventions, guidelines, and/or rules for use in the static analyzer. For instance, a company may define a rule that all variable names for a product "A" should start with alphabet "a_". Additionally or alternatively, embodiments of the present invention can provide understandable error messages mapped to the source code together with help snippet. In some implementations, embodiments of the present invention can provide collision detection of triggers, i.e., collisions between triggering events in the code for utilizing a database table or other resource, which can be overlooked by the developers. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The servers) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The servers) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/ or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
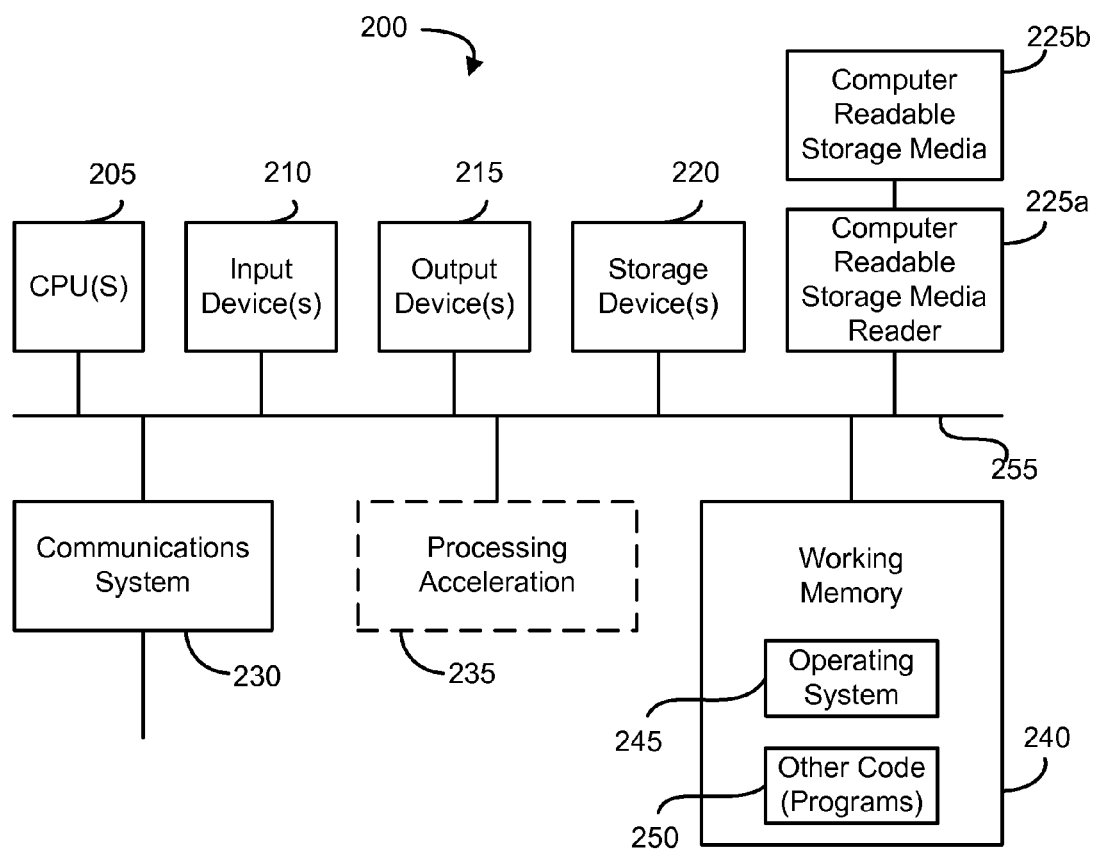
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
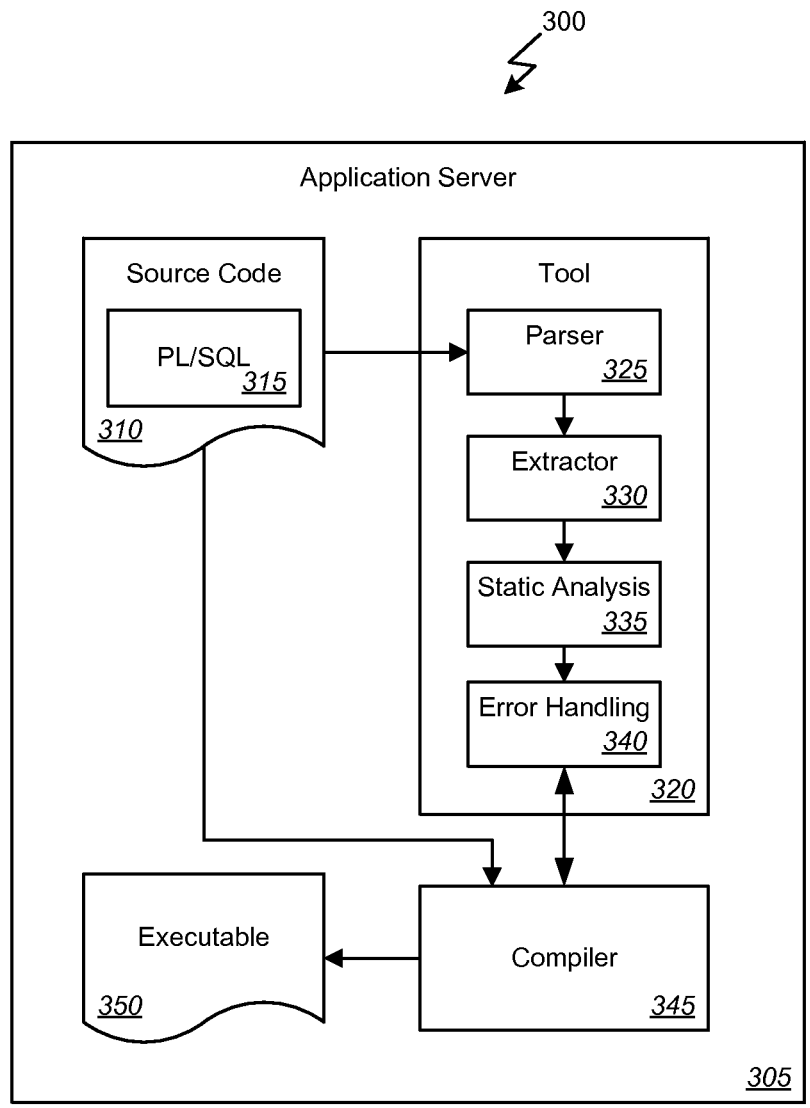
FIG. 3 is a block diagram illustrating, at a high-level, functional components of a system for performing static analysis of query expressions embedded in programming language source code according to one embodiment of the present invention.

FIG. 3 is a block diagram illustrating, at a high-level, functional components of a system for performing static analysis of query expressions embedded in programming language source code according to one embodiment of the present invention. In this example, the system 300 includes an application server 305 or other computer system such as described above. The application server 305 can execute a tool 320 adapted to perform a static analysis on a source code file 310 that include embedded query instructions 315 or other database commands. For example, Procedural Language/Structured Query Language (PL/SQL) commands and other SQL commands may be embedded in Java, PHP or other source files. Embodiments of the present invention are directed to taking precautions during the development stage to help in find potential bugs in the source code file 310 and in the embedded query instructions 315. With such an upfront analysis, the tool 320 can perform a static analysis of the query instructions and generate a report 355 of errors and warnings based on the static analysis.

More specifically, the analysis can start with identifying PL/SQL scripts or other query statements by a parser 325 of the tool 320 reading and parsing the source code file 310. In some cases, the user may be given a chance by the tool 320 to choose a list of packages or folders and the objects to be considered (procedures, functions and triggers, etc.) and identified by the parser 325. Static analysis of queries statements can then proceed by an extractor 330 of the tool 320 extracting code from the parsed statements and creating procedures out of them. For example, one procedure may be made per source code file 310. Then, static analysis 335 can be performed on the created procedure, e.g., by applying a set of rules for naming conventions etc. to the parsed query statements and/or created procedure. In some cases, static analysis can include using a compiler 345 appropriate to the source code file 310 and created procedures to compile the procedure(s) created by the extractor 330 to create an executable and/or get a list of error and warnings. The list of errors and warning from the compiler and/or the static analysis 335 can be used to generate a report 355. The report can comprise an error/warning list from the compiler and/or from the static analysis applying defined rules. According to one embodiment, in addition to or instead of the native or built-in static analysis 335 of the tool, developers may use any other third-party static analyzer (not shown here) as per their requirements. With the help of a proxy for such a third-party tool to read the report/result generated, developers can be provided with a comprehensive list of errors and warnings accumulating all in one in the generated report 355.

According to one embodiment, once the errors and/or warnings are collected by the error handling module 340 of the tool 320, they can be referenced back to the source code 310, e.g., by location, procedure name, etc., making it easier for the developer to find and fix the mistake causing the error. Further for listing custom made errors and warnings, the tool 320 can parse 325 the scripts 315 against the custom, pre-defined rules mentioned above. The generated errors and warnings can be categorized and presented to the user in the report 355. Besides providing the user with understandable error message for those which are difficult to comprehend, the report 355 may also provide help snippets which would assist the user to fix the errors.

Stated another way, performing static analysis of one or more query expressions 315 embedded in programming language source code 310 can comprise the tool 320 extracting the one or more query expressions from the programming language source code. The static analysis 355 can be performed on the extracted one or more query expressions. Results of performing the static analysis 355 on the one or more query expressions can be reported, e.g., through a report 355 presented in a user interface of an analysis tool 320. The results can relate errors and warning generated by performing the static analysis 335 to the source code 310 from which the one or more query expressions 315 are extracted, e.g., by line number, function or module name, and/or in other ways.

Extracting the one or more query expressions 315 and performing the static analysis 335 can comprise a parser 325 reading and parsing the source code 310 in which the one or more query expressions 315 are embedded. Query expression code can be extracted by the extractor 330 for the one or more query expressions from the parsed source code. A procedure can be created from the extracted query expression code and the static analysis 335 can be performed on the created procedure, for example by the compiler 345 appropriate to the source code file 310 compiling the created procedure.

Additionally or alternatively, performing the static analysis 335 can comprise analyzing use of one or more database tables by the extracted one or more query expressions, detecting a collision between triggers in the extracted one or more query expressions based on said analyzing, and generating an error or warning based on detecting the collision. Generally speaking, a collision is an undesirable situation where more than one trigger events in the query expressions 315 conflict and thus enter into an infinite loop. The following example illustrates how triggers can enter into such collisions. Assuming two tables "abc" and "xyz" two triggers can be created as: 1) the INSERT Trigger, triggerA on table "abc" issues an UPDATE on table "xyz" and 2) the UPDATE Trigger, triggerB on table "xyz" issues an INSERT on table "abc." In such a situation, when there is a row inserted in table "abc," triggerA fires and will update table "xyz." When the table "xyz" is updated, triggerB fires and will insert a row in table "abc."

The following example illustrates how a trigger can become void or ineffective. Again assuming two tables "abc" and "xyz" two triggers can be created: 1) The INSERT Trigger, triggerA->update on table "abc" issues an INSERT on table "xyz" and 2) the DELETE Trigger, triggerB->update on table "abc" issues a DELETE on table "xyz." In such a situation, when there is a row inserted in table "abc," insertion happens due to triggerA followed by a deletion due to triggerB. By exploiting the data available in a user triggers table, a check can be made for those triggers that conflict with the triggering table. Thus, embodiments of the present invention can maintain tables to store more information about triggers like tables which are referenced in the trigger body. This can help detect cyclic cascading and no-operation triggers.

According to one embodiment, reporting the results 355 of performing the static analysis 335 on the one or more query expressions by the error handling module 340 of the tool 320 can comprise receiving one or more errors or warnings from compiling the created procedure. The received one or more errors or warnings can be categorized by the error handling module 340, e.g., by severity etc. The categorized errors or warnings can be mapped by the error handling module 340 to the source code 310 from which the one or more query expressions 315 were extracted and a report 355 of the categorized and mapped one or more errors or warnings can be generated by the error handling module 340.

For example in some cases, generating the report 355 of the categorized and mapped one or more errors or warnings can comprise categorizing by the error handling module 340 the one or more errors or warnings based on a content of each error or warning and assigning by the error handling module 340 an additional message to errors and warnings considered to be difficult to understand based on said categorizing. That is, certain errors thrown by the compiler 345 may not be easily comprehensible. Hence, embodiments of the present invention include certain custom error messages which would assist the developer to understand the errors without much difficulty. According to such embodiments, errors and warnings can be categorized, e.g., as "Easily understandable", "Processable" or "Abstruse." Those categorized as "Processable" and "Abstruse" can be given additional messages which would help the user understand the errors or warnings easily. For instance, "PLS-00996 out of memory" may be translated as Cause 1: "Program might be recursing too deeply. Else you might be referencing a wrong row in a PL/SQL table" or Cause 2: "Machine might have run out of space. Try running with scalable one."

Additionally or alternatively, generating the report of the categorized and mapped one or more errors or warnings can comprise assigning to one or more of the errors or warnings a help snippet from a repository of help information and based on the error or warning. This help snippet repository can grow over time as solutions are found and help information is added. With this, embodiments are not focusing only on reporting errors/warning but also giving a direction to the developer(s) for finding an appropriate solution to it and fixing the problem with a low turn-around time.

Figure 4:
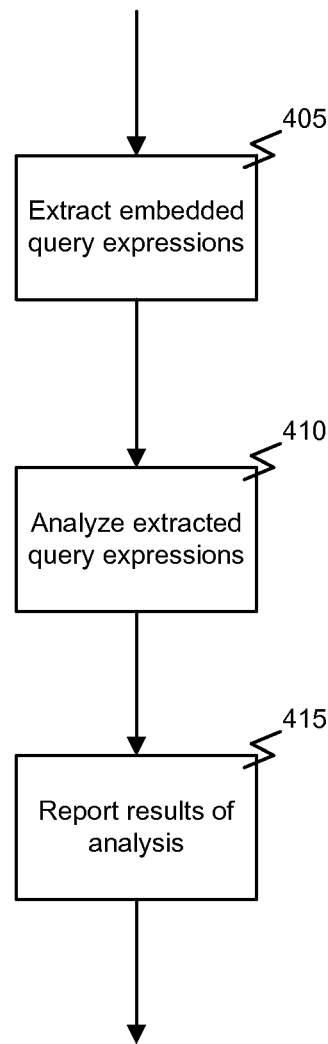
FIG. 4 is a flowchart illustrating a process for performing static analysis of query expressions embedded in programming language source code according to one embodiment of the present invention.

FIG. 4 is a flowchart illustrating a process for performing static analysis of query expressions embedded in programming language source code according to one embodiment of the present invention. As illustrated in this example, performing static analysis of one or more query expressions embedded in programming language source code can comprise extracting 405 the one or more query expressions from the programming language source code. The static analysis can be performed 410 on the extracted one or more query expressions. Results of performing the static analysis on the one or more query expressions can be reported 415, e.g., through a user interface of an analysis tool etc. The results can relate errors and warning generated by performing the static analysis to the source code from which the one or more query expressions are extracted, e.g., by line number, function or module name, and/or in other ways.

Figure 5:
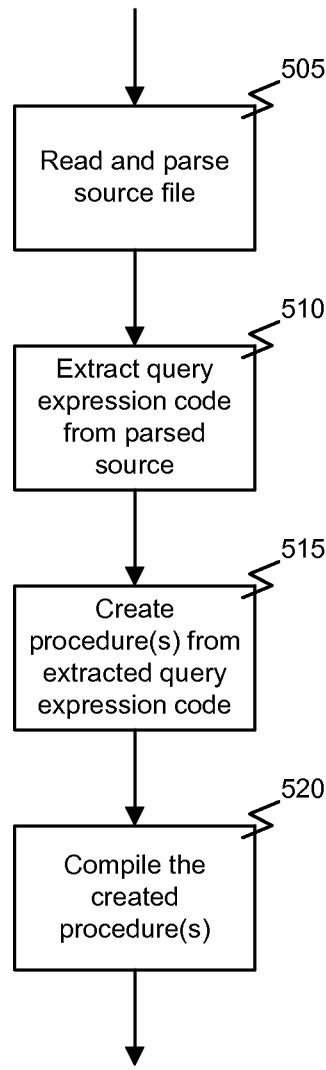
FIG. 5 is a flowchart illustrating additional details of a process for extracting query expressions from programming language source code and performing static analysis on the extracted query expressions according to one embodiment of the present invention.

FIG. 5 is a flowchart illustrating additional details of a process for extracting query expressions from programming language source code and performing static analysis on the extracted query expressions according to one embodiment of the present invention. As illustrated in this example, extracting the one or more query expressions and performing the static analysis can comprise reading and parsing 505 the source code in which the one or more query expressions are embedded. Query expression code can be extracted 510 for the one or more query expressions from the parsed source code. A procedure can be created 515 from the extracted query expression code and the static analysis can be performed on the created procedure, for example by compiling 520 the created procedure. Additionally or alternatively, performing the static analysis can comprise analyzing use of one or more database tables by the extracted one or more query expressions, detecting a collision between triggers in the extracted one or more query expressions based on said analyzing, and generating an error or warning based on detecting the collision. In other cases, performing the static analysis may additionally or alternatively comprise applying one or more user defined rules to the extracted one or more query expressions and, in response to any of the extracted one or more query expressions violating the one or more user defined rules, generating an error or warning.

Figure 6:
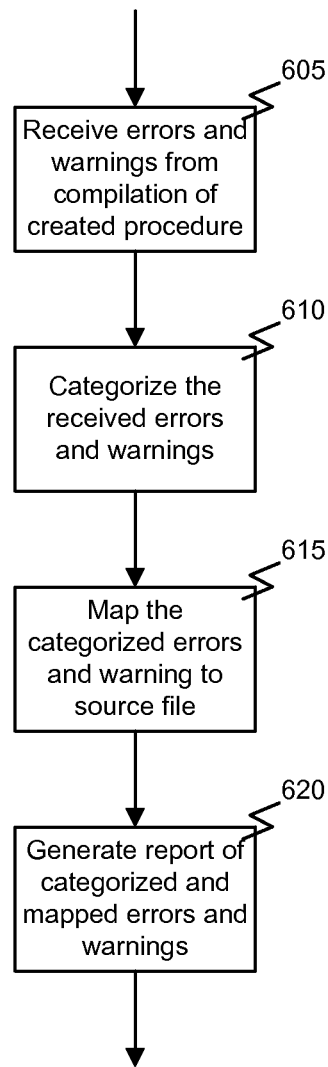
FIG. 6 is a flowchart illustrating additional details of a process for reporting results of performing a static analysis of query expressions extracted from programming language source code according to one embodiment of the present invention.

FIG. 6 is a flowchart illustrating additional details of a process for reporting results of performing a static analysis of query expressions extracted from programming language source code according to one embodiment of the present invention. As illustrated in this example, reporting the results of performing the static analysis on the one or more query expressions can comprise receiving 605 one or more errors or warnings from compiling the created procedure. The received one or more errors or warnings can be categorized 610, e.g., by severity etc. The categorized errors or warnings can be mapped 615 to the source code from which the one or more query expressions were extracted and a report of the categorized and mapped one or more errors or warnings can be generated 620. For example in some cases, generating the report of the categorized and mapped one or more errors or warnings can comprise categorizing the one or more errors or warnings based on a content of each error or warning and assigning an additional message to errors and warnings considered to be difficult to understand based on said categorizing. Additionally or alternatively, generating the report of the categorized and mapped one or more errors or warnings can comprise assigning to one or more of the errors or warnings a help snippet from a repository of help information and based on the error or warning.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for performing static analysis of one or more query expressions embedded in programming language source code, the method comprising:

extracting the one or more query expressions from the programming language source code, wherein extracting the one or more query expressions and performing the static analysis comprises reading the source code in which the one or more query expressions are embedded, parsing the source code in which the one or more query expressions are embedded, extracting query expression code for the one or more query expressions from the parsed source code, creating a procedure from the extracted query expression code, and compiling the created procedure;

performing the static analysis on the extracted one or more query expressions, wherein performing the static analysis further comprises detecting a collision between triggers in the extracted one or more query expressions based on said analyzing and applying one or more user defined rules to the created procedure, the one or more user defined rules defining guidelines and conventions for the query expressions and in response to any of the extracted one or more query expressions violating the one or more user defined rules, generating an error or warning; and reporting results of performing the static analysis on the one or more query expressions, wherein the results relate errors and warning generated by performing the static analysis to the source code from which the one or more query expressions are extracted.

2. The method of claim 1, wherein reporting the results of performing the static analysis on the one or more query expressions comprises:

receiving one or more errors or warnings from compiling the created procedure;

categorizing the received one or more errors or warnings;

mapping the categorized errors or warnings to the source code from which the one or more query expressions were extracted; and generating a report of the categorized and mapped one or more errors or warnings.

3. The method of claim 1, wherein performing the static analysis further comprises:

analyzing use of one or more database tables by the extracted one or more query expressions; and generating an error or warning based on detecting the collision.

4. The method of claim 2, wherein generating the report of the categorized and mapped one or more errors or warnings further comprises:
- categorizing the one or more errors or warnings based on a content of each error or warning; and
- assigning an additional message to errors and warnings considered to be difficult to understand based on said categorizing.

5. The method of claim 2, wherein generating the report of the categorized and mapped one or more errors or warnings further comprises assigning to one or more of the errors or warnings a help snippet from a repository of help information and based on the error or warning.

6. The method of claim 3, further comprising receiving one or more user defined validation criteria and wherein generating an error or warning is further based on applying the one or more user defined validation criteria.

7. A system comprising:
- a processor; and
- a memory coupled with and readable by the processor and storing a set of instructions which, when executed by the processor, causes the processor to perform static analysis of one or more query expressions embedded in programming language source code by:
  - extracting the one or more query expressions from the programming language source code, wherein extracting the one or more query expressions and performing the static analysis comprises reading the source code in which the one or more query expressions are embedded, parsing the source code in which the one or more query expressions are embedded, extracting query expression code for the one or more query expressions from the parsed source code, creating a procedure from the extracted query expression code, and compiling the created procedure;
  - performing the static analysis on the extracted one or more query expressions, wherein performing the static analysis further comprises detecting a collision between triggers in the extracted one or more query expressions based on said analyzing and applying one or more user defined rules to the created procedure, the one or more user defined rules defining guidelines and conventions for the query expressions and in response to any of the extracted one or more query expressions violating the one or more user defined rules, generating an error or warning; and
  - reporting results of performing the static analysis on the one or more query expressions, wherein the results relate errors and warning generated by performing the static analysis to the source code from which the one or more query expressions are extracted.

8. The system of claim 7, wherein reporting the results of performing the static analysis on the one or more query expressions comprises:
- receiving one or more errors or warnings from compiling the created procedure;
- categorizing the received one or more errors or warnings;
- mapping the categorized errors or warnings to the source code from which the one or more query expressions were extracted; and
- generating a report of the categorized and mapped one or more errors or warnings.

9. The system of claim 7, wherein performing the static analysis further comprises:
- analyzing use of one or more database tables by the extracted one or more query expressions;
- generating an error or warning based on detecting the collision.

10. The system of claim 8, wherein generating the report of the categorized and mapped one or more errors or warnings further comprises:
- categorizing the one or more errors or warnings based on a content of each error or warning; and
- assigning an additional message to errors and warnings considered to be difficult to understand based on said categorizing.

11. The system of claim 8, wherein generating the report of the categorized and mapped one or more errors or warnings further comprises assigning to one or more of the errors or warnings a help snippet from a repository of help information and based on the error or warning.

12. The system of claim 9, further comprising receiving one or more user defined validation criteria and wherein generating an error or warning is further based on applying the one or more user defined validation criteria.

13. A computer-readable memory storing a set of instructions which, when executed by a processor, causes the processor to perform static analysis of one or more query expressions embedded in programming language source code by:
- extracting the one or more query expressions from the programming language source code, wherein extracting the one or more query expressions and performing the static analysis comprises reading the source code in which the one or more query expressions are embedded, parsing the source code in which the one or more query expressions are embedded, extracting query expression code for the one or more query expressions from the parsed source code, creating a procedure from the extracted query expression code, and compiling the created procedure;
- performing the static analysis on the extracted one or more query expressions, wherein performing the static analysis further comprises detecting a collision between triggers in the extracted one or more query expressions based on said analyzing and applying one or more user defined rules to the created procedure, the one or more user defined rules defining guidelines and conventions for the query expressions and in response to any of the extracted one or more query expressions violating the one or more user defined rules, generating an error or warning; and
- reporting results of performing the static analysis on the one or more query expressions, wherein the results relate errors and warning generated by performing the static analysis to the source code from which the one or more query expressions are extracted.

14. The computer-readable memory of claim 13, wherein reporting the results of performing the static analysis on the one or more query expressions comprises:
- receiving one or more errors or warnings from compiling the created procedure;
- categorizing the received one or more errors or warnings;
- mapping the categorized errors or warnings to the source code from which the one or more query expressions were extracted; and
- generating a report of the categorized and mapped one or more errors or warnings.

15. The computer-readable memory of claim 13, wherein performing the static analysis further comprises:
- analyzing use of one or more database tables by the extracted one or more query expressions; and
- generating an error or warning based on detecting the collision, wherein generating the report further comprises assigning to one or more of the errors or warnings a help snippet from a repository of help information and based on the error or warning.

* * * * *